Figure 1:
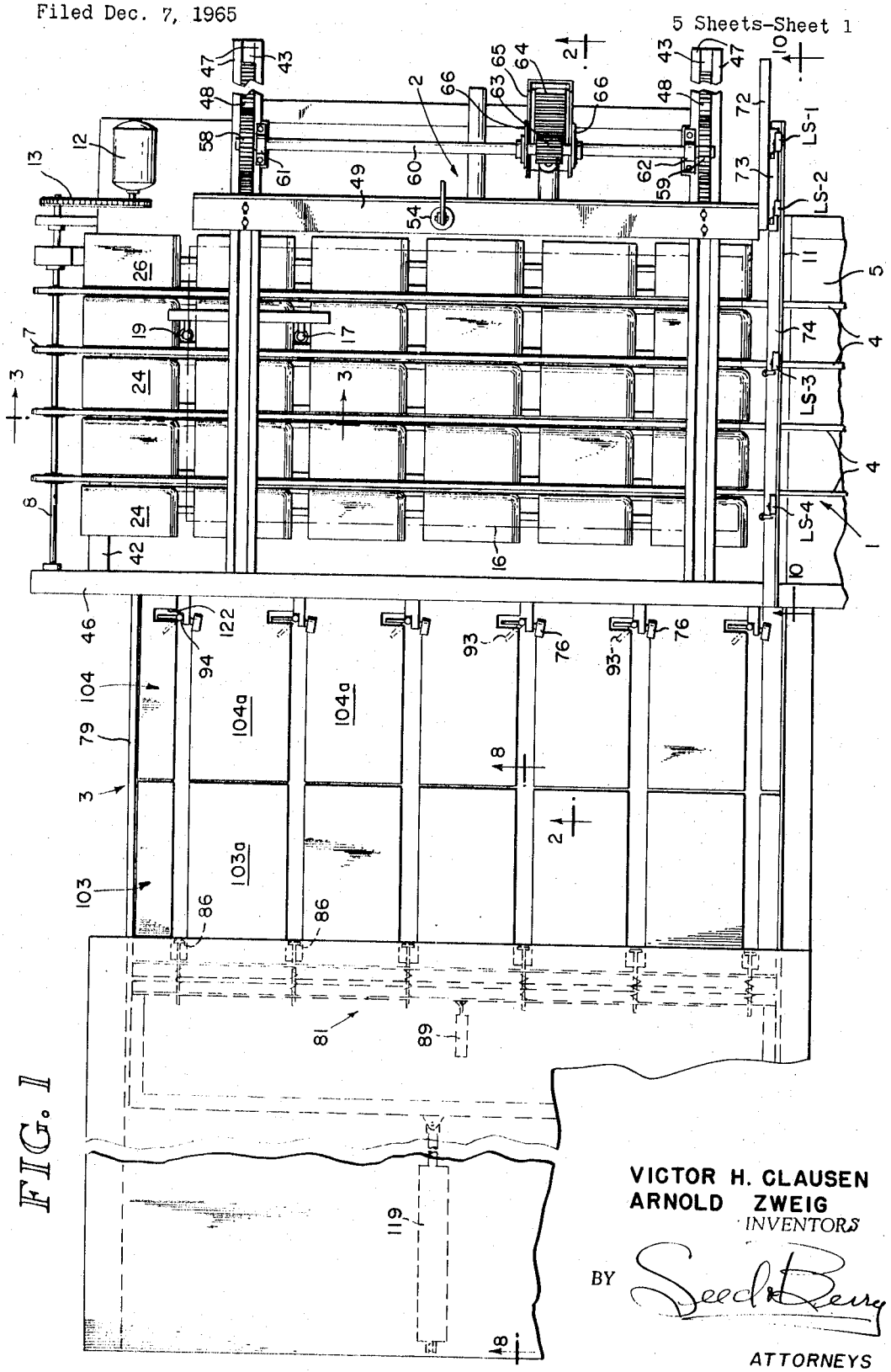

VICTOR H. CLAUSEN
ARNOLD ZWEIG
INVENTORS

BY Seed & Berry

ATTORNEYS

Nov. 28, 1967 V. H. CLAUSEN ETAL 3,355,168
SHEET MATERIAL HANDLING DEVICE
Filed Dec. 7, 1965 5 Sheets-Sheet 3

VICTOR H. CLAUSEN
ARNOLD ZWEIG
INVENTORS

BY Seed & Berry

ATTORNEYS

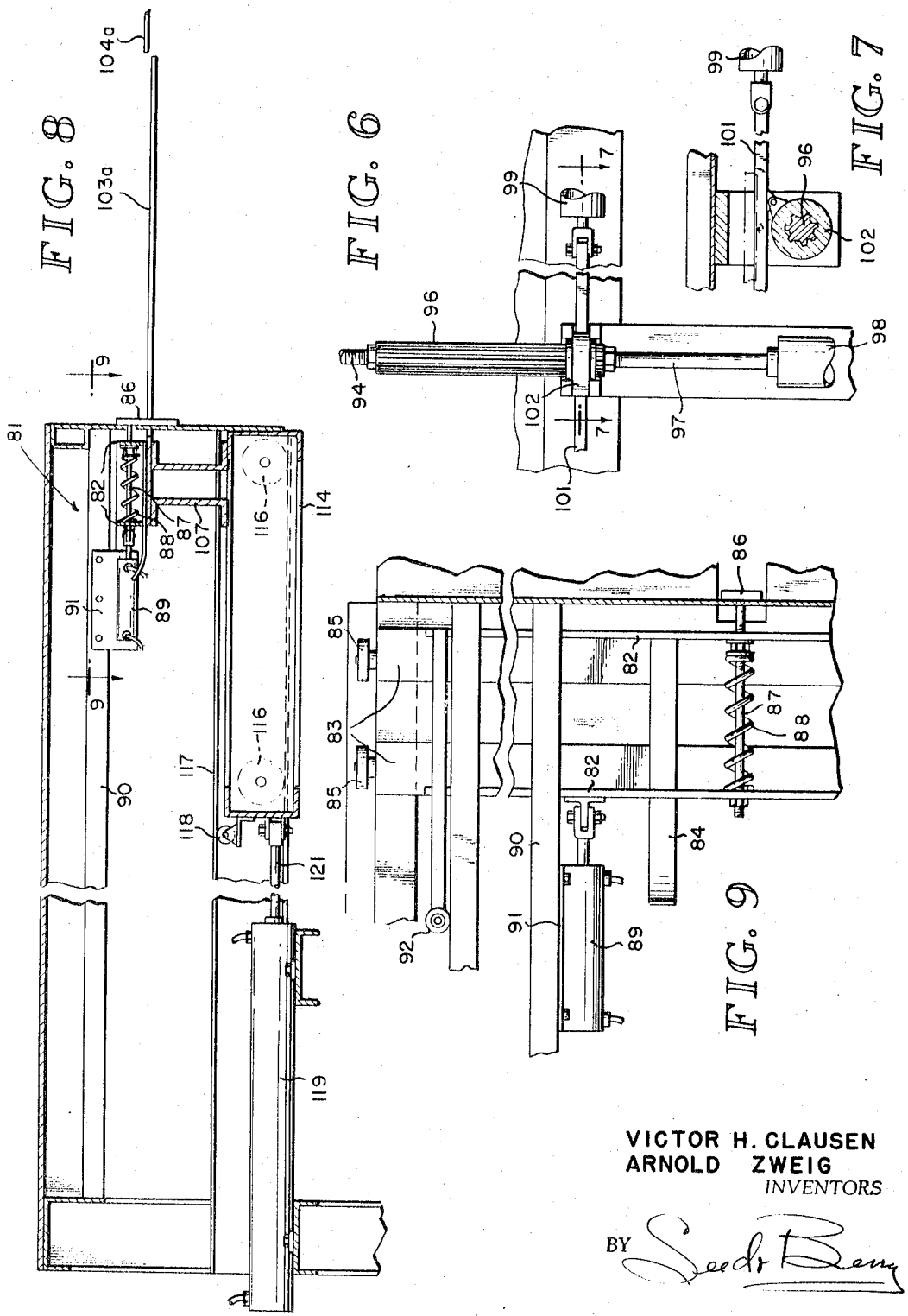

United States Patent Office 3,355,168
Patented Nov. 28, 1967

3,355,168
SHEET MATERIAL HANDLING DEVICE
Victor H. Clausen, Bellevue, and Arnold Zweig, Olympia, Wash., assignors to Simpson Timber Company, Seattle, Wash., a corporation of Washington
Filed Dec. 7, 1965, Ser. No. 512,135
14 Claims. (Cl. 271—68)

The present invention relates in general to material handling apparatus and more particularly to an apparatus for handling sheet material such as wood veneer or the like in such a manner as to remove individual sheets laterally from a conveyor and to drop the same vertically so as to form an even stack.

Although the apparatus of the present invention is not limited to use with any specific sheet material, the device is of particular utility in the plywood industry when utilized in a continuously operating plywood panel layup system. In such a system individual sheets of wood veneer are automatically selected, placed on a conveyor, certain of the veneers are coated with an adhesive, and thereafter the sheets are formed into a stack which comprises a sandwich or panel layup. The stack is then subjected to a hot press operation to form the finished panel. In this type of system it is important that the adhesive coated veneers do not slide over one another in stacking but are laid down carefully so as to avoid disturbing the coat of adhesive placed on certain of the veneers within the sandwich or panel. In the prior art this operation was usually accomplished manually which is an extremely slow and expensive process and at times wasteful because of damage done to the veneer during manual handling.

According to the present invention the adhesive-coated and uncoated veneer sheets are rapidly moved into the apparatus, and sequentially brought to a stop, removed laterally from the conveyor onto a drop table, aligned and then dropped vertically to form a stack for removal to a hot press or the like. In this manner, the coated sheets remain at all times in a substantially horizontal plane and no grasping or gripping of the sheets is necessary and the operation is completely automatic.

The primary object of the present invention is, therefore, to provide a sheet handling apparatus for removing individual sheets of material from a conveyor and dropping the sheets individually to form a stack for further handling.

Another object of the present invention is to provide an apparatus of the character described which requires no manual attention and which performs the handling operation without grasping or turning the sheets and without disturbing the top surfaces of the sheets.

Another object of the present invention is to provide an apparatus of the character described which will operate at a rapid speed and which is completely automatic in performing the sequential handling steps.

Figure 2:
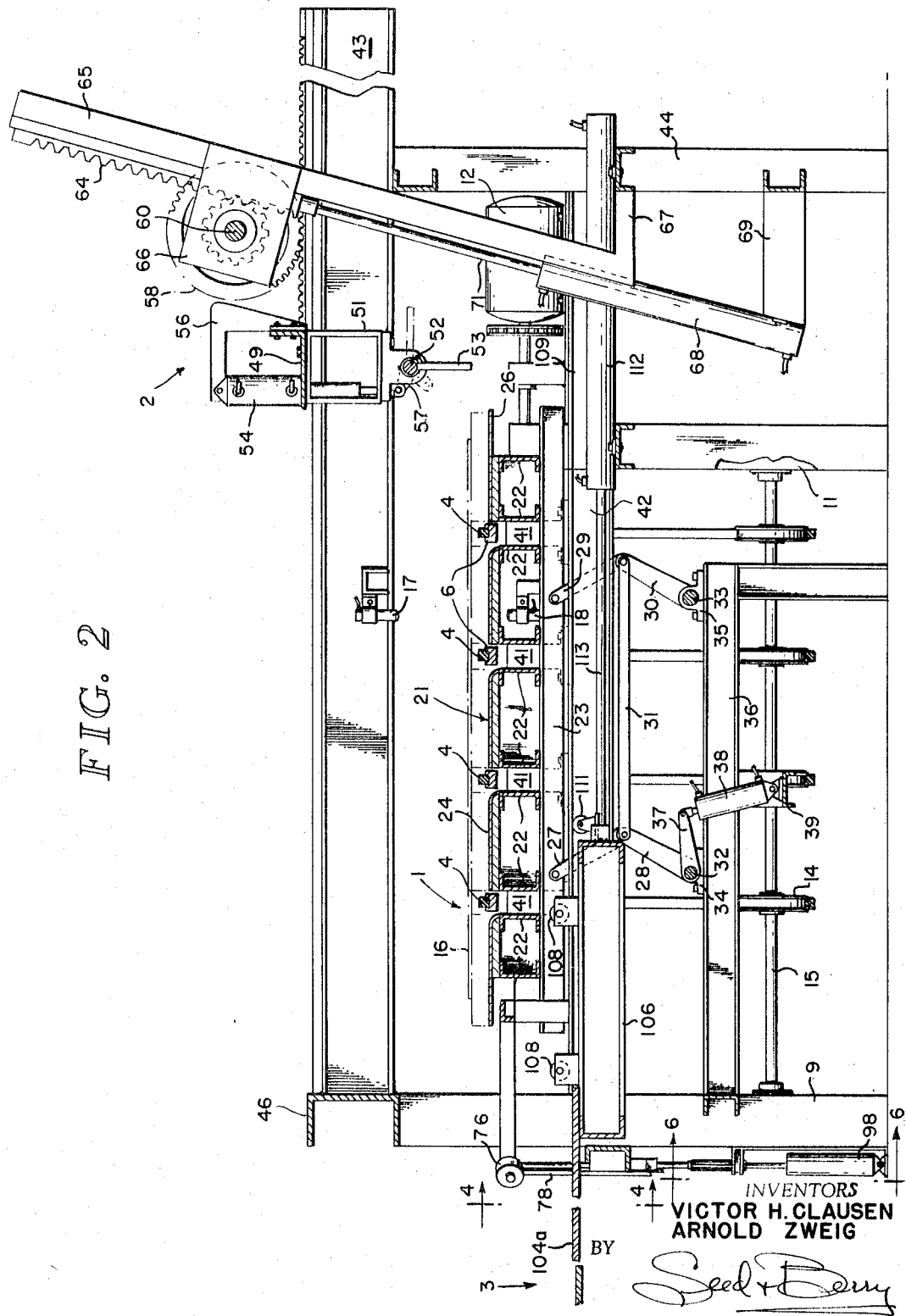
Figure 3:
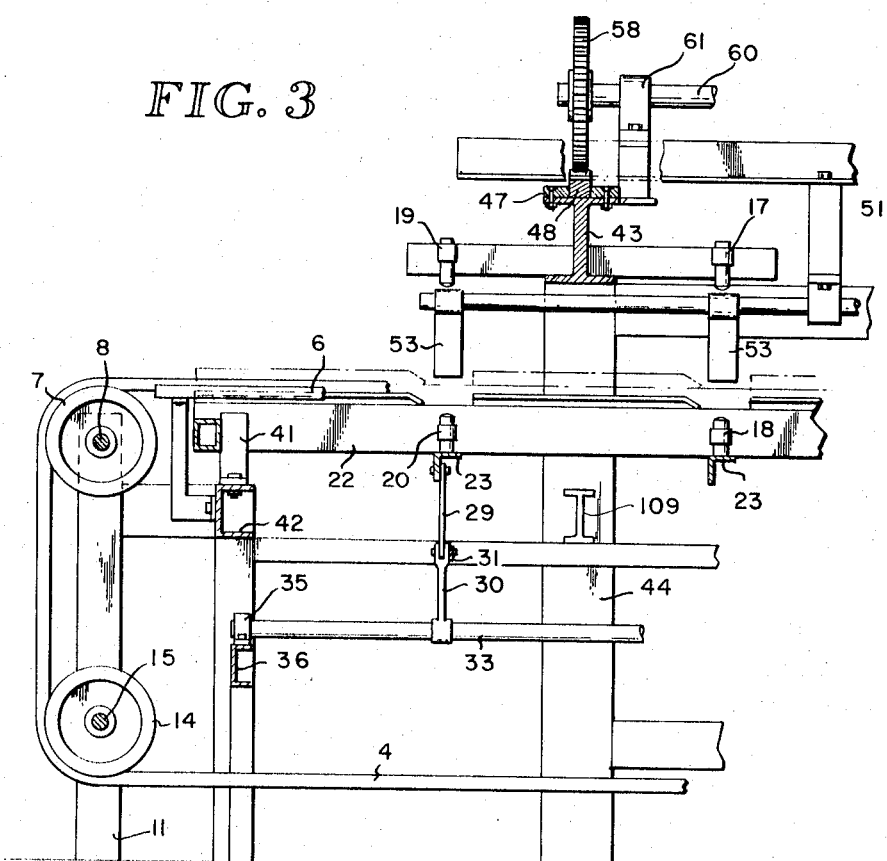
Figure 4:
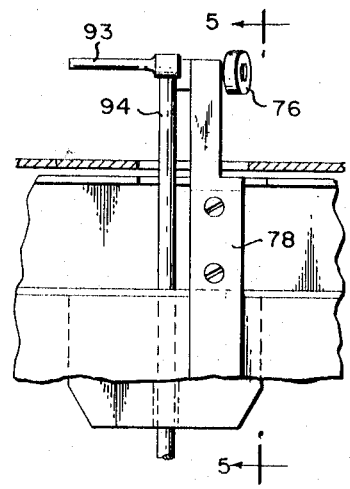
Figure 5:
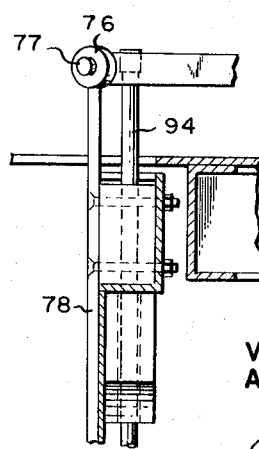
Figure 11:
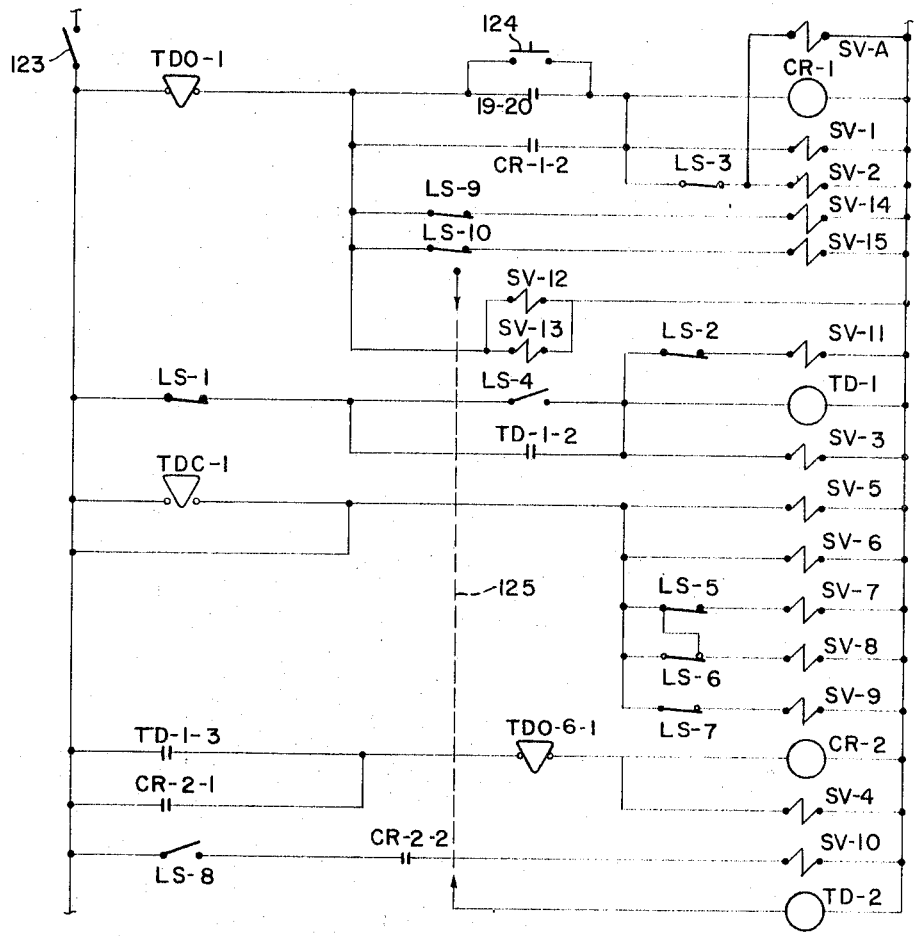
Figure 10:
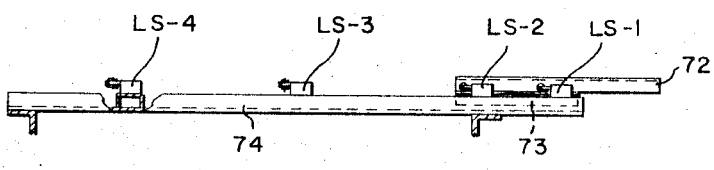

Other objects and advantages of the present invention will be apparent to those skilled in the art from the following specification and claims and from the drawings wherein:

FIG. 1 is a top plan view of the device;
FIG. 2 is a transverse cross-sectional view taken along lines 2—2 of FIG. 1;
FIG. 3 is a longitudinal cross-sectional view taken along lines 3—3 of FIG. 1;
FIG. 4 is an elevational detail taken along lines 4—4 of FIG. 2;
FIG. 5 is an elevational detail taken along lines 5—5 of FIG. 4;
FIG. 6 is an elevational detail of the lowering and turning mechanism for hold down fingers and the continuation of the mechanism shown in FIG. 4;
FIG. 7 is a horizontal cross-section taken along lines 7—7 of FIG. 6;
FIG. 8 is a transverse cross-sectional view taken along lines 8—8 of FIG. 1;
FIG. 9 is a horizontal cross-sectional view taken along lines 9—9 of FIG. 8;
FIG. 10 is a cross-sectional detail taken along lines 10—10 of FIG. 1 showing the location of certain switch operations; and
FIG. 11 is a schematic of the electrical control system for the apparatus.

Referring now to the drawings wherein like reference numerals indicate identical parts in the various views, FIG. 1 is a plan view of the overall device which includes generally an infeed conveyor 1, a transversely movable pusher assembly 2 and a drop table 3.

The conveyor 1 will be understood to be in line with the conveyor system of a plywood layup apparatus or other conveyor or material handling apparatus so as to receive the veneer pieces or other sheet material directly therefrom. The conveyor 1 includes a plurality of transversely spaced inlet feed belts 4 which move across an infeed table 5 and a plurality of support channels or guides 6, shown most clearly in FIG. 2. The belts 4 are driven by pulleys 7 fixed to a drive shaft 8 which is shown mounted between vertical frame members 9 and 11. The shaft 8 is driven by a variable speed electric motor 12 through a chain drive 13 in a conventional manner. The belts 4 travel in the counter clockwise direction as viewed in FIG. 3 and also pass about the idler pulleys 14 carried on idler shaft 15. Only the ends of the conveyor belts which are mounted in conjunction with the transfer apparatus of the present invention are illustrated but it will be understood that the belts pass about similar idler pulleys, remote from the end of the conveyor shown, and move so as to bring individual sheets of veneer 16 into the apparatus beneath the pusher assembly as illustrated most clearly in FIG. 2. The variable speed motor 12 in practice will be capable of moving the belts 4 and the plywood veneer at approximately 400 feet per minute at top speed and, as will be understood from a description of the electrical circuit and from a description of the sequential operation of the device, the speed of the motor is retarded to approximately 50 feet per minute and then completely halted to allow the sheets to be removed laterally from the conveyor. For this purpose, first and second sets of electric eye switches 17–18 and 19–20 are mounted so that the moving sheet must pass between the switch components to intercept the light beam as it moves into the apparatus. The switch 17–18 produces a first signal which, through a relay contact, changes the speed of the motor 12 and a second signal is produced by the switch 19–20 to break the motor circuit through a relay contact to stop the conveyor when the moving sheet is completely within the device as illustrated in dotted lines in FIG. 1.

Beneath the level of the top runs of the belts 4 is a vertically movable transfer table 21 comprising a plurality of longitudinal beams 22 supported on the cross beams 23 spaced along the length of the longitudinal beams. The table surface is made up of a plurality of transversely and longitudinally spaced plate members 24 having one curved longitudinal edge and one curved lateral edge with a rounded corner therebetween to facilitate sliding of the sheet. The longitudinal edge plates 26 may constitute flat metal plates since the sheet is removed laterally to the left as viewed in FIG. 1. The table frame is supported on the pivoted links 27–28 and 29–30 with the sets of links being joined by a transverse rod 31 which provides for even movement of the table in a vertical direction. The lower links 28 and 30 are fixed to longitudinal rods 32 and 33 respectively which are journal mounted in suitable pillow blocks 34 and 35 supported on transverse beams 36. Only one set of pivoted links and support beams is shown in FIG. 2 but it will be understood that a set of pivoted links, connecting link and support beam, substantially identical to that shown in FIG. 2, are located at the opposite end of the table. The rod 32 is provided with a fixed crank arm 37 which is connected to the piston rod of an air cylinder 38 which is, in turn, pivotally mounted to a frame member 39. With this arrangement, it will be apparent that operation of the cylinder 38 controls the rotational position of rods 32 and 33 and hence the vertical position of the table structure 21. In addition, guide blocks 41 at each end of the table, mounted on cross beams 42, serve to guide the vertical reciprocation of the table. In this manner, the table may be raised to lift the sheet 16 above the conveyor belts 4 to allow the sheet to be moved laterally from the conveyor belts. As will be explained in detail later in connection with the electrical schematic shown in FIG. 11, when the light beam between the electric eye switch 19–20 is interrupted, the electrical circuit for the motor 12 is broken to halt the conveyor and, at the same time, a servo valve is operated through a relay contact which energizes the air cylinder 38 to raise the table. Interrupting the light beam between the electric eye switch 19–20 also serves to energize the air cylinder for operating the pusher assembly 2 for removing the sheet laterally as will now be described in detail.

The pusher assembly 2 comprises a pair of longitudinally spaced transversely extending I-beams or the like 43 which are identical in structure and extend across the transfer table. The beams 43 are supported on vertical uprights 44 at one end and may be welded or otherwise secured to the longitudinal frame member 46 at their opposite ends. Each of the beams 43 is provided with a set of elongated guide members 47 which extend along the side edges thereof to form a channel therebetween for the reception of elongated racks 48 which slide freely therein. The racks 48 are provided with gear teeth which mesh with pinions to be described which serve to move the racks within the channels formed by the guide members 47. An angle iron 49, comprising a pusher bar, extends between the two racks 48 and is secured to both racks so as to be moved thereby.

A plurality of mounting frames 51, one of which is shown in detail in FIG. 2, are fixed to the bottom of the member 49 along the length thereof and serve to rotatably mount the shaft 52. The shaft 52 has fixed thereto a plurality of spaced pusher members 53 as illustrated in FIGS. 2 and 3 which serve to contact the sheet 16 at the spaces between the plates 24 and 26 when the table is raised for the purpose of removing the sheet from the table. The pusher members 53 normally extend in a vertical direction as shown in FIG. 2 and remain in this position as the pusher assembly moves to the left as viewed in FIG. 2 to remove the sheet from the table. The pusher members are moved through approximately a 90° arc, to the horizontal position shown in dotted lines in FIG. 2, upon the return stroke of the pusher member in order to avoid any possible contact with an incoming sheet. The air cylinder 54 is centrally mounted on the member 49 and secured in position by a brace 56 for the purpose of operating the shaft 52. The cylinder 54 has its piston rod connected to a crank arm 57 fixed to the shaft 52 for rotating the shaft. The control means for operating the cylinder 54 will presently be described in connection with the control circuit shown in FIG. 11.

The rack members 48 are caused to reciprocate within the channels formed by the guides 47 by means of the pinions 58 and 59 in mesh therewith which are fixed to a longitudinal shaft 60 mounted in the pillow blocks 61 and 62 supported on the beams 43. The shaft 60 is provided with a third pinion 63 along its length which is rotated by means of the reciprocating rack 64. The rack 64 is guided within an inclined channel member 65, the upper end of which is supported by the shaft 60 by means of the plates 66. The bottom end of the channel 65 may be secured to the machine frame by means of a brace or the like 67 as illustrated in FIG. 2. An air cylinder 68 is fixed to the bottom end of the channel 65 and secured to the machine frame by brace 69. The piston rod 71 of the cylinder is connected to the rack 64 and thus reciprocation of the piston rod 71 causes rotation of the shaft 60 to move the pusher bar 49 and pusher members 53 to sweep or push the sheet from the table.

The infeed end of the pusher bar 49 is provided with a pair of limit switch operating bars 72 and 73 as shown most clearly in FIG. 10 which serve to sequentially contact a plurality of limit switches LS–1, LS–2, LS–3 and LS–4 mounted on a cross member 74 which extends across the infeed end of the device as illustrated in FIG. 1. As will be explained in connection with the control circuit shown in FIG. 11, the contacting of limit switches LS–3 and LS–4, on the forward stroke of the pusher bar 49 and the contacting of limit switches LS–1 and LS–2 on the return stroke of the pusher bar, serves as signal means for controlling the operation of the various components to be described.

As illustrated in FIGS. 1 and 2 the sheet 16 is moved to the left by the pusher fingers 53 on the pusher bar 49 and deposited onto the drop table 3. As the sheet is moved laterally, it passes over a plurality of rollers 76, shown in detail in FIGS. 4 and 5, carried on stub axles 77 which are fixed to the vertical stop plates 78. The plates 78 are spaced longitudinally along the side edge of the drop table and are mounted on the general frame structure, as illustrated. It will be noted that the rollers 76 are disposed at an angle with relation to the drop table in such a manner that the sheet is directed against a stationary end plate 79 extending along the forward end of the drop table. In this manner, the sheets are directed and aligned against the plate 79 before the drop table operates. As the sheet is deposited on a drop table 3, a crowder mechanism indicated generally at 81 in FIG. 1 is operated to also align the longitudinal edges of the veneer before dropping. The crowder mechanism 81 will now be described in detail with specific reference to FIGS. 1, 8 and 9.

The crowder mechanism comprises an elongated frame composed of longitudinal upright members 82 and horizontal members 83 which may be secured by means of welding or the like with a plurality of transverse members including guides 84 connecting the longitudinal members to form the frame. The crowder frame is supported for reciprocation by rollers 85 at both ends thereof which engage a portion of the frame as illustrated in FIG. 9. The crowder frame also includes a plurality of crowder fingers 86 which extend in an upright direction and which are mounted to the frame by means of the slidable rods 87 which extend between the longitudinal members 82. The compression springs 88 provide a resilient back up for the rods 87 so as to make the fingers yieldable upon contacting an irregularly shaped sheet. The upright pusher fingers 86 extend between openings or slots in the drop table as illustrated in FIG. 1 and the entire crowder frame is advanced and retracted by means of an air cylinder 89 fixed to a portion of the frame 90 by means of the bracket 91. The fingers 86 are advanced to contact the edge of the sheet lying on the drop table by means of the cylinder 89 with the spring backed pusher fingers serving to align the sheet against the stop plates 78 on the opposite side of the table as previously described. The reciprocation of crowder frame 81 may be guided by the rollers 92 at either end thereof which contact stationary guide rails, as illustrated. Thus, with the actuation of the cylinder 89, the sheet lying on the drop table is aligned on three edges ready for dropping.

In order to insure that the individual sheets are dropped vertically and to insure proper edge alignment, a set of vertically movable hold-down fingers 93, shown in detail in FIGS. 4 and 5, are mounted adjacent the plates 78 with the fingers 93 being rotatable through approximately a 45° arc as shown by the dotted line positions in FIG. 1 so as to contact the edge of the sheet and move downwardly therewith. The hold-down fingers 93 are fixed to vertical rods 94 which are connected to the piston rod 97 of an air cylinder 98. As will presently be described, the cylinder 98 serves to move the fingers downwardly with the falling sheet. The fingers 93 and the shaft 94 are rotated through the approximate 45° arc by means of an air cylinder 99 the piston rod 97 of which is connected to a common reciprocating operator bar 101. The bar 101 is pivotally connected to a collar 102 on the spline section 96 of each of the vertical rods 94. According to the sequence of operation, the crowder mechanism is operated to align the sheet and simultaneously the fingers 93 are rotated so as to be able to contact the top surface of the sheet and, as the drop table 3 separates, as will be described, the fingers move downwardly as the sheet falls to aid in the downward travel.

Turning now to the details of the drop table 3, the table comprises two movable sections indicated generally at 103 and 104 in FIG. 1. The table half 104 is made up of a plurality of individual horizontally disposed plates 104a which are joined along their inward ends and secured by welding or the like to a movable frame 106 illustrated in FIG. 2. Likewise, the table half 103 comprises the individual plates 103a which are joined at their inward ends and secured to a connecting frame 107 as illustrated in FIG. 8. As will be noted in FIGS. 2 and 8, the plates 104a are disposed a slight distance above the plates 103a in order to prevent any possible hangup of the sheet as it slides on to the drop table.

Referring to FIG. 2, the frame 106 constitutes a box frame which extends beneath the vertically reciprocable transfer table 21 between the movable links 27-28 and 29-30 on each end of the table and is supported for reciprocation by means of rollers 108 which ride on the top flanges of suitable I-beams 109 placed at each end of the frame 106, one of which is shown in FIG. 2, and which may be a part of the overall frame structure of the apparatus. An additional roller 111 contacts the bottom surface of the flanges of the I-beams in order to stabilize the frame 106. The frame 106 is reciprocated laterally by means of the air cylinder 112 which has its piston rod 113 connected to the frame. The cylinder 112 may be fixed to the apparatus in any suitable manner such as that shown in FIG. 2 so as to be stationary.

The table half 103 is similarly mounted as illustrated in detail in FIG. 8 wherein the connecting frame 107 is shown as being mounted on the movable box frame 114. The frame 114 is supported by the rollers 116 at either end thereof so as to engage the flanges of I-beams 117 which are a part of the overall frame structure. The frame 114 also includes the rollers 118 which serve to stabilize the frame. The frame 114 and connecting frame 107 are reciprocated by means of the air cylinder 119 fixed to the frame structure as illustrated with its piston rod 121 being connected to the frame 114. In operation, the cylinders 112 and 119 are operated simultaneously to open and close the drop table with a rapid movement so as to allow the sheet to drop vertically when the table is open. As illustrated in FIG. 1 the plates 104a of the table half 104 have notched out portions 112 which allow upward movement of the hold-down fingers 93 when they are raised to the starting position after the halves of the table have closed, as will be understood from the description of a cycle of operation of the machine in connection with the electrical schematic of FIG. 11.

Having described the structural details of the apparatus, reference is now made to FIG. 11 for an explanation of the sequential operation of the various motors and switches.

*Operation*

As afore mentioned, the conveyor belts 4 in practice are driven so as to advance a sheet into the apparatus at a speed of approximately 400 feet per minute but it will be understood that the operating speed of the conveyor belt may be varied as desired to suit any condition. The electrical circuit for the motor 12 may constitute a separate circuit well within the skill of an artisan and is not shown as a part of the control circuit of FIG. 11. As the sheet enters the apparatus and interrupts the light beam of the electric eye switch 17-18, the signal thus produced may be used to operate a conventional relay for reducing the speed of the motor to approximately 50 feet per second in a manner well known to the prior art.

The control circuit for the apparatus may be energized by closing the manual switch 123 and it will be noted that a manual override switch 124 is also provided to bypass the electric eye switch 19-20 the contacts of which are shown in FIG. 11. After the sheet has been slowed down by breaking the light beam of the switch 17-18 the light beam of the switch 19-20 is interrupted so as to close the contact 19-20 shown in FIG. 11. When the contacts 19-20 are closed, the control relay CR-1 is energized and one of the contacts CR-1-2 of the relay closes so as to seal the relay in around the switch 19-20 and to energize the servo valve SV-A to actuate the air cylinder 38 to raise the transfer table 21 to the dotted line position shown in FIG. 2 at which time the sheet is ready for removal from the conveyor. Another of the contacts of the relay CR-1 (not shown) may be used to break the electric circuit to the motor 12 so as to halt the conveyor. The circuit for the motor 12 may constitute a separate control circuit and is thus omitted from the present explanation.

Energizing of the control relay CR-1 also serves to energize the servo valve SV-1 for energizing the pusher cylinder 68 and servo valve SV-2 is energized to open the exhaust valve for the double acting cylinder 68 to permit the cylinder to advance the pusher bar 49. As the pusher bar 49 advances, the pusher fingers 53 move the sheet 16 from the transfer table onto the drop table 3. As the pusher bar 49 advances, the switch contact member 72 contacts limit switch LS-3, shown in FIG. 1 which is opened so as to deenergize the servo valve SV-2 and close the forward exhaust valve which has a metering orifice so as to provide a cushion effect for the moving pusher bar 49 near the end of its travel. Opening of the switch LS-3 also deenergizes the servo valve SV-A to return the transfer table 21.

As the pusher bar 49 reaches the end of its travel the contact member 72 contacts limit switch LS-4 and closes the same so as to energize the time delay relay TD-1 which seals itself in through one of its contacts TD-1-2. TD-1-2 also energizes SV-3 raising pusher fingers 53 to the horizontal position shown in dotted lines in FIG. 2. The time delay relay TD-1 has two time delay contacts, delay open contact TDO-1 and delay close contact TDC-1. After a short delay, TDO-1 opens so as to break the circuit through CR-1 so as to deenergize servo valve SV-1 and the cylinder 68 starts its return stroke at once since the pusher bar 49, at this time, has reached its limit of forward travel. With CR-1 deenergized, motor 12 starts at high speed again. The sheet has now been pushed onto the drop table 3 and is ready to be dropped. Closing of the relay contact TD-1-2 has also energized the servo valve SV-11 to permit quick exhaust of cylinder 68 on the return of pusher bar 49.

Energization of the relay TD-1 also caused closing of the relay contact TD-1-2 which energizes the control relay CR-2. The relay CR-2 locks itself in by one of its contacts CR-2-1. With the energization of relay CR-2, the servo valve SV-4 is energized so as to actuate the air cylinder 99 to rotate the hold-down fingers 93 through the 45° arc to the dotted line position shown in FIG. 1 ready for contact with the falling sheet.

As soon as the time delay close contact TDC-1 goes in after a short delay, the servo valves SV-5 and SV-6 are actuated so as to energize the air cylinders 112 and 119 to begin the opening motion of the drop table halves 104 and 103 respectively. Servo valve SV-1 has also been energized so as to actuate the crowder cylinder 89 which advances the crowder fingers 86 to align the sheet before dropping as previously described. As the table halves part, the motion is utilized to operate a limit switch LS-5 which deenergizes the servo valve SV-7 to reverse the crowder cylinder 89 to return the crowder fingers to the original position.

It will also be noted that, at the time servo valves SV-5 and SV-6 were energized to cause the table halves to open, servo valves SV-8 and SV-9 were also energized to control quick opening exhaust ports in the cylinders 112 and 119 to allow extremely rapid opening of the table halves. As the table halves move, and at some point near their end of opening travel, they contact limit switches LS-6 and LS-7 which deenergize the servo valves SV-8 and SV-9 to close the quick exhaust ports. It will also be noted that upon the energization of CR-2 a second set of contacts of the relay CR-2, namely CR-2-2 have closed for a purpose to be described.

As the hold-down fingers 93 initially rotate through a 45° arc, the limit switch LS-8 was contacted by one of the moving fingers and closed so as to energize the servo valve SV-10 through the contact CR-2-2 for the purpose of actuating the air cylinder 98 in a downward direction causing the fingers to contact the sheet and insure downward travel. In the meantime, the pusher bar 49 is continuing its return travel and the contact bar 73 thereon contacts the limit switch LS-2, shown in FIG. 1, which operates the servo valve SV-11 to close the return exhaust on the cylinder 68 which has a metering orifice to cushion the return movement of the pusher bar.

When the contact member 73 finally contacts the limit switch LS-1 it is open so as to deenergize the relay TD-1 and the time delay open relay contact TDO-1 again closes causing energization of the servo valves SV-12 and SV-13 which control the cylinders 112 and 119 to start the table halves 104a and 103a on their return motion. It will also be noted that upon closing of the contact TDO-1, quick exhaust servo valves SV-14 and SV-15 were energized to allow the table halves to close rapidly. As the table halves return, limit switches LS-9 and LS-10 are contacted and opened so as to drop out servo valves SV-14 and SV-15 which have metered orifices to cushion the return of the table halves.

Contacting of limit switch LS-10 upon return of the table halves also closes a circuit through the line 125 to energize the time delay relay TD-2 which has a time delay open contact TDO-6 which, after a short delay opens to deenergize the relay CH-2 to open the contacts CR-2-1 and CR-2-2 returning the servo valve SV-4 to its original position which controls the cylinder 99 to rotate the hold-down fingers 93 to their original position and, at the same time, the servo valve SV-10 is deenergized to cause the cylinder 98 to reverse and raise the fingers to their original position through the slots 22 in the plates 104a of the table half 104 which is now in the closed position.

A cycle of operations is thus completed and the device is ready for the reception of the next sheet of material to be dropped.

From the foregoing, it will be apparent to those skilled in the art that the present invention offers significant improvements in sheet material handling devices of the character under consideration. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. A sheet handling device comprising in combination; conveyor means for moving a sheet to a predetermined position, means to raise said sheet above said conveyor, a normally closed drop table movable to an open drop position, pusher means for contacting said sheet and moving the same onto said drop table simultaneously with the raising of the sheet, and means to actuate said drop table to the open position after a predetermined time delay upon the sheet being moved thereto.

2. A sheet material handling device comprising in combination; conveyor means for moving a sheet to a predetermined position, means to raise said sheet above said conveyor upon the positioning thereof, a drop table having separable table sections, pusher means for contacting said sheet and moving the same onto said drop table simultaneously with the raising of the sheet, means to mount said table sections for movement laterally away from each other to thereby open said drop table, and actuating means to move said table sections after a predetermined time delay upon the sheet being moved thereto.

3. A sheet material handling device comprising in combination; a vertically movable transfer table, conveyor means for positioning a sheet in a horizontal plane above said transfer table, means to raise said transfer table to lift said sheet from said conveyor means responsive to the positioning of the sheet, a drop table positioned adjacent said transfer table and including first and second independently movable drop table sections, pusher bar means mounted for forward movement across the surface of said transfer table, actuating means for moving said pusher bar across the surface of said transfer table in contact with said sheet simultaneously with the raising thereof to remove the sheet onto said drop table, means to mount said drop table sections for movement laterally away from each other to open said drop table, and actuating means to move said drop table sections after a predetermined time delay upon the pusher bar means reaching its limit of forward travel.

4. The device according to claim 3 including, first stop means located along one lateral edge of said drop table, second stop means located along one end of said drop table, reciprocable crowder means mounted opposite said first stop means and positioned to contact the edge of said sheet, means to actuate said crowder means simultaneously with the actuation of said drop table to align said sheet against said first stop means, and a plurality of freely rotatable rollers mounted above said first stop means, said rollers being disposed at an angle with the direction of movement of said sheet and positioned to be contacted by said sheet so as to guide the sheet against said second stop means, whereby said sheet is aligned along one side and one end prior to dropping vertically.

5. The device according to claim 3 including a plurality of vertical shafts located along one edge of said drop table, means to mount said shafts for vertical reciprocation and rotational movement, hold down fingers fixed to each of said shafts and normally extending substantially parallel to the edge of said drop table, first actuating means responsive to the movement of said pusher bar to its limit of forward movement to rotate said shafts so as to extend said fingers over the surface of said drop table, and second actuating means responsive to the rotation of said shafts to move said fingers vertically downwardly simultaneously with the dropping of said sheet so as to aid in the downward travel thereof, and means for returning said shafts to the initial position upon closing of said drop table sections.

6. The device according to claim 3 wherein said conveyor means comprises a plurality of parallel laterally spaced conveyor belts, common drive means for said belts, first signal means responsive to the movement of a sheet to a first predetermined position above said transfer table for controlling said drive means to reduce the speed of said belts, and second signal means responsive to the movement of said sheet to a second predetermined position above said transfer table to deactivate said drive means to halt said conveyor.

7. The device according to claim 6 wherein said transfer table comprises; a table frame, means for mounting said frame for vertical reciprocation beneath said conveyor belts, guide means for guiding the reciprocation of said table frame, a plurality of laterally spaced plates mounted on said table frame to form a sectionalized table surface, the spacing between said plates being arranged to coincide with the position of said conveyor belts, whereby said plates pass between said belts to contact and lift said sheet above the conveyor upon raising of said transfer table, said means to raise said transfer table being controlled by said second signal means, whereby said sheet is lifted from said conveyor upon reaching the second predetermined position.

8. A sheet material handling device comprising in combination; a vertically movable transfer table, conveyor means for positioning a sheet in a horizontal plane above said table, means to raise said transfer table to lift said sheet above said conveyor means responsive to the positioning of the sheet, a drop table positioned adjacent said transfer table, pusher bar means, means mounting said pusher bar for movement across the surface of said transfer table, said pusher bar means including downwardly extending pusher fingers for contacting a lateral edge of said sheet when the transfer table is in the raised position, actuating means for moving said pusher bar across the surface of said transfer table with the pusher fingers thereof in contact with said sheet simultaneously with the raising of the transfer table to remove said sheet laterally onto said drop table, said drop table comprising, first and second independently movable drop table sections, means to mount said drop table sections for movement laterally in opposite directions away from each other to open said table to drop said sheet vertically and actuating means to move said table sections after a predetermined time delay upon the pusher bar reaching its limit of forward travel.

9. The device according to claim 8 including, first stop means located along one lateral edge of said drop table, second stop means located along one end of said drop table, reciprocable crowder means mounted opposite said first stop means and positioned to contact the edge of said sheet, means to actuate said crowder means simultaneously with the actuation of said drop table to align said sheet against said first stop means, and a plurality of freely rotatable rollers mounted above said first stop means, said rollers being disposed at an angle with the direction of lateral movement of said sheet and positioned to be contacted by said sheet so as to guide the sheet against said second stop means, whereby said sheet is aligned along one side and one end prior to dropping vertically.

10. The device according to claim 8 including a plurality of vertical shafts located along one edge of said drop table, means to mount said shafts for vertical reciprocation and rotational movement, hold down fingers fixed to each of said shafts and normally extending substantially parallel to the edge of said drop table, first actuating means responsive to the movement of said pusher bar to its limit of forward movement to rotate said shafts so as to extend said fingers over the surface of said drop table, and second actuating means responsive to the rotation of said shafts to move said fingers vertically downwardly simultaneously with the dropping of said sheet so as to aid in the downward travel thereof, and means for returning said shafts to the initial position upon closing of said drop table sections.

11. The device according to claim 8 wherein said conveyor means comprises a plurality of parallel laterally spaced conveyor belts, common drive means for said belts, first signal means responsive to the movement of a sheet to a first predetermined position above said transfer table for controlling said drive means to reduce the speed of said belts, and second signal means responsive to the movement of said sheet to a second predetermined position above said transfer table to deactivate said drive means to halt said conveyor.

12. The device according to claim 11 wherein said transfer table comprises, a table frame, means mounting said frame for vertical reciprocation beneath said conveyor belts, guide means for guiding the reciprocation of said table frame, a plurality of laterally spaced plates mounted on said table frame to form a sectionalized table surface, the spacing between said plates being arranged to coincide with the position of said conveyor belts, whereby said plates pass between said belts to contact and lift said sheet above the conveyor upon raising of said transfer table, said means to raise said transfer table being controlled by said second signal means, whereby said sheet is lifted from said conveyor upon reaching the second predetermined position.

13. The device according to claim 8 wherein said pusher bar means includes a pusher for extending parallel to said transfer table and the direction of travel of said conveyor, said means for mounting said pusher bar including support beams located above said transfer table and said conveyor means and extending transversely thereacross, said pusher bar being supported adjacent its ends on said beams, means to guide said bar for movement on said beams, a rotatable mounting shaft supported by said pusher bar, said pusher fingers being fixed to said shaft and normally extending in a vertically downward direction during forward travel of said pusher bar to contact said sheet, actuating means on said pusher bar to rotate said shaft and move said fingers to a substantially horizontal position upon return movement of said pusher bar.

14. The device according to claim 13 wherein the actuating means for said pusher bar means comprises, an elongated rack member connected to each end of said pusher bar, said rack members being guided for reciprocation along said beams, a drive shaft, first and second pinion members fixed to said shaft, means to journal mount said drive shafts with said pinions in mesh with said racks respectively, and power means connected to rotate said drive shaft in either direction.

References Cited

UNITED STATES PATENTS 2,633,251   3/1953   Bruce _____ 214—6

EVON C. BLUNK, *Primary Examiner.*

E. A. SROKA, *Assistant Examiner.*